United States Patent [19]
Izukawa et al.

[11] Patent Number: 6,100,654
[45] Date of Patent: Aug. 8, 2000

[54] DRIVING DEVICE FOR A VIBRATION TYPE MOTOR

[75] Inventors: Kazuhiro Izukawa, Misato; Kazuya Higuma, Funabashi, both of Japan

[73] Assignee: Canon Kabushiki Kaisha, Tokyo, Japan

[21] Appl. No.: 09/238,815

[22] Filed: Jan. 27, 1999

[30] Foreign Application Priority Data

Jan. 29, 1998 [JP] Japan .................................. 10-016862
Jan. 29, 1998 [JP] Japan .................................. 10-017131

[51] Int. Cl.$^7$ ........................................................ H01L 4/08
[52] U.S. Cl. ........................ 318/114; 318/116; 310/317; 310/323
[58] Field of Search ..................................... 310/316, 317, 310/319, 323, 328; 318/114, 116

[56] References Cited

U.S. PATENT DOCUMENTS

| 4,833,358 | 5/1989 | Suzuki et al. | 310/316 |
| 4,954,741 | 9/1990 | Furutsu et al. | 310/316 |
| 5,159,253 | 10/1992 | Shimizu et al. | 318/606 |
| 5,495,152 | 2/1996 | Fukui | 318/116 |

*Primary Examiner*—Nestor Ramirez
*Assistant Examiner*—Judson H. Jones
*Attorney, Agent, or Firm*—Morgan & Finnegan, LLP

[57] ABSTRACT

This invention relates to a driving device for a vibration wave motor and, more particularly, to a driving device for setting the level of a driving periodic signal to a low level in driving within a predetermined range of high driving frequencies, and to a high level in driving within a predetermined range of low driving frequencies, thereby reducing the power consumption.

24 Claims, 8 Drawing Sheets

DRIVING DEVICE FOR A VIBRATION TYPE MOTOR

BACKGROUND OF THE INVENTION

1. Field of the Invention

The present invention relates to a driving device for a vibration type motor and, more particularly, to a driving device for a vibration type motor that changes driving conditions by a driving frequency.

2. Related Background Art

Conventionally, a driving device for a vibration type motor such as a vibration wave motor controls the rotation speed by changing the driving frequency, as disclosed in Japanese Patent Application Laid-Open No. 63-154074. Alternatively, the driving device controls the rotation speed by setting a plurality of driving voltages, selecting an arbitrary one in advance, and changing the driving frequency, or by setting an input power by PWM in advance in accordance with variations in driving voltage and changing the driving frequency.

In any of the above-mentioned driving devices for a vibration wave motor, the rotation speed of the vibration motor is controlled by changing the driving frequency during a series of operations from the start to end of driving. Driving is inefficient such that the power consumption is almost uniform regardless of the rotation speed or the input power increases for a lower motor rotation speed.

An element (output transistor such as a switching element) on the output side in the motor driving circuit must have a large output, which increases the mounting area and the cost.

When the driving frequency becomes lower than the resonant frequency, the conventional vibration wave motor suddenly stops. This problem is solved by the following method.

More specifically, the vibration state of the vibration member of the vibration wave motor is monitored to detect a shift from the resonant frequency. If the driving frequency comes near the resonant frequency, the driving frequency is generally changed not to be lower than the resonant frequency.

According to the conventional method for acheiving above, the arrangement for always detecting the above shift is provided.

SUMMARY OF THE INVENTION

It is an object of the present invention to provide a driving device for changing driving conditions in accordance with the rotation speed of a motor to increase/decrease the power consumption and particularly to reduce the power consumption during low-speed rotation.

It is another object of the present invention to provide a device for controlling the frequency not to be erroneously lower than the resonant frequency even with the above arrangement of reducing the power consumption.

To achieve the above objects, one aspect of the application is to provide a driving device for a vibration type motor for generating a vibration of the vibration member and obtaining a driving force by applying a driving periodic signal to an electro-mechanical energy conversion element portion arranged on the vibration member, comprising a frequency setting circuit for setting a frequency of the periodic signal, and an adjusting circuit for adjusting a level of the periodic signal applied to the electromechanical energy conversion element portion in accordance with the frequency set by the frequency setting circuit, the circuit adjusting the level of the signal which is set as a high frequency to a level lower than the level of the signal which is set as a low frequency.

To achieve the above objects, one aspect of the application is to provide a vibration type motor in which an electromechanical energy conversion element portion is arranged on a vibration member, and a periodic signal is applied to the element portion to generate a vibration of the vibration member, thereby obtaining a driving force, comprising driving force control means for changing a frequency of the periodic signal to change the driving force, regulating means for regulating or changing the frequency by the control means in accordance with a shift from a resonant frequency of the motor that is detected by detecting means, condition setting means for setting a driving condition of the vibration type motor, and switching means for changing over between operative and inoperative states of the regulating means in accordance with the driving condition set by the condition setting means.

To achieve the above objects, one aspect of the application is to provide a vibration type motor in which an electromechanical energy conversion element portion is arranged on a vibration member, and a periodic signal is applied to the element portion to generate a vibration of the vibration member, thereby obtaining a driving force, comprising driving force control means for changing a frequency of the periodic signal to change the driving force, regulating means for regulating or changing the frequency by the control means in accordance with a shift from a resonant frequency of the motor that is detected by detecting means, and control means for suspending an operation of the regulating means when the frequency of the periodic signal is higher than a predetermined frequency, and a voltage of the periodic signal is lower than a predetermined voltage, and for activating the operation of the regulating means when the frequency of the periodic signal is lower than the predetermined frequency, and the voltage of the periodic signal is higher than the predetermined voltage.

The above and other objects of the present invention will be apparent from the following description in conjunction with the accompanying drawings.

DETAILED DESCRIPTION OF THE PREFERRED EMBODIMENTS

First Embodiment

Figure 1:
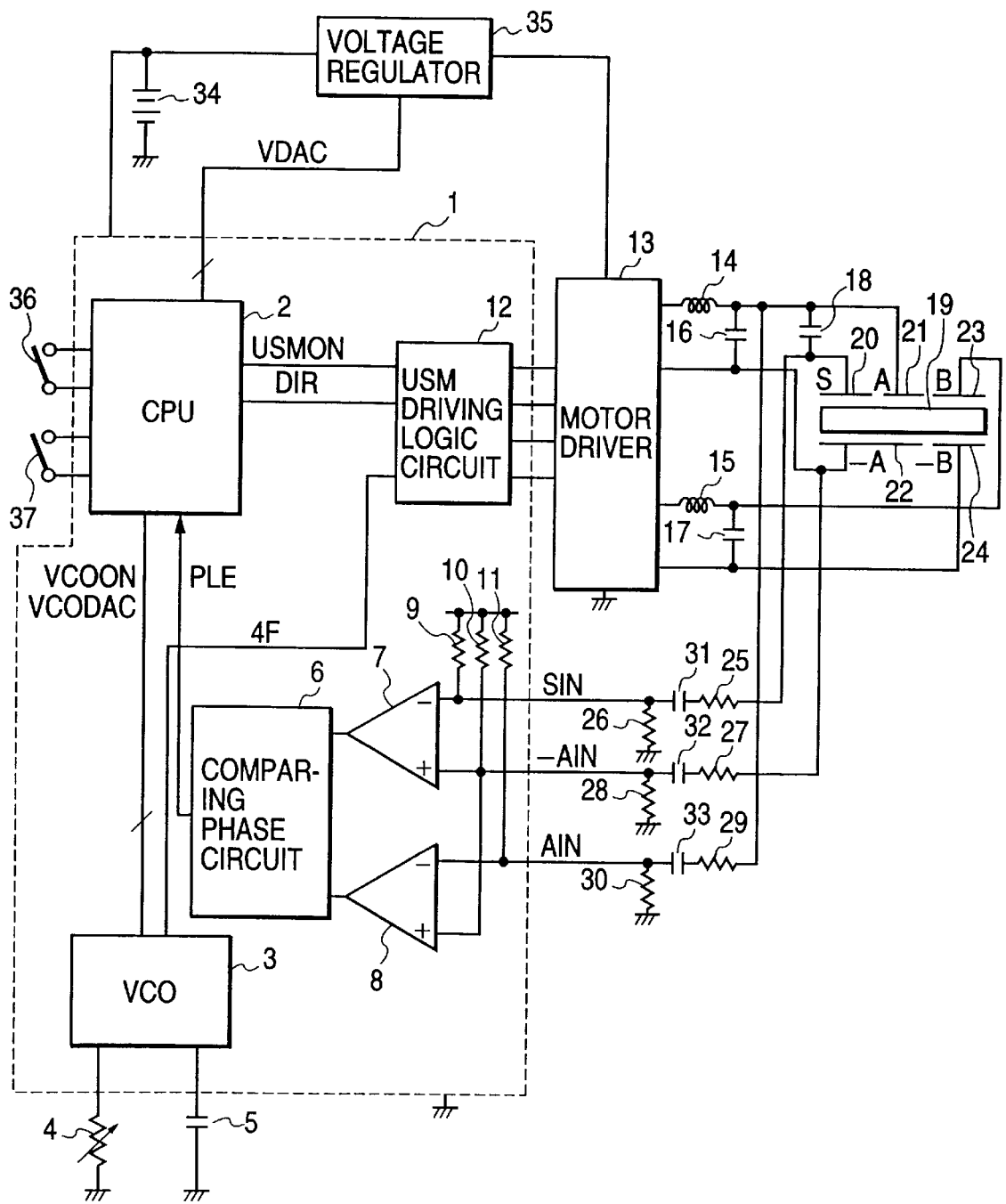
FIG. 1 is a block diagram showing the first embodiment of the present invention.

FIG. 1 is a block diagram showing the first embodiment of the present invention.

Referring to FIG. 1, a control circuit 1 comprises a microcomputer (CPU) 2, an oscillating circuit (VCO) 3, a comparing phase circuit 6, comparator circuits 7 and 8, and a driving logic circuit 12 for a vibration wave motor as a vibration type motor.

The microcomputer (CPU) 2 controls the whole operation. The oscillating circuit (VCO) 3 is turned on/off by an output VCOON from the microcomputer 2 and changes the oscillated frequency by an output VCODAC.

In changing the oscillated frequency, an internal set voltage is determined by an 8-bit output (VCODAC) from the microcomputer 2. Next, the current value of a current used for the oscillated frequency is determined by the internal set voltage and a resistor 4. An oscillated frequency corresponding to the current value is determined by charging/discharging the current to/from a capacitor 5. This oscillated frequency is a frequency 4 F four times a driving frequency F of the vibration wave motor.

The relationship between the 8-bit output (VCODAC) from the microcomputer 2 and the oscillated frequency will be exemplified.

VCODAC=00H 4F=160 kHz

VCODAC=32H 4F=156 kHz

VCODAC=FFH 4F=139.6 kHz

Changing the resistance value of the resistor 4 can correct changes in oscillated frequency caused by circuit variations.

The output 4 F from the oscillating circuit (VCO) 3 is input to the driving logic circuit 12 for the vibration wave motor.

The driving logic circuit 12 outputs a driving output to a motor driver 13 based on a reception of an output USMON from the microcomputer 2. The driving output has a frequency F whose time phase is shifted by 90° from the output 4 F of the oscillating circuit (VCO) 3 by an output DIR from the microcomputer 2.

The output DIR from the microcomputer 2 changes the phase relationship to 90° and −90°. The motor driver 13 amplifies the driving output power and outputs it to a vibration wave motor 19 via coils 14 and 15 and capacitors 16 and 17. A capacitor 18 adjusts the phase relationship between the S and A phases.

The motor driver 13 receives an output from a battery 34 via a voltage regulator 35. An output voltage from the voltage regulator 35 is changed by an output VDAC (8 bits) from the microcomputer 2.

For example, for VDAC=A9H, the output voltage is 3.3 V, and for VDAC=8 AH, the output voltage is 2.7 V.

Operation of the comparing phase circuit 6 will be described.

The comparing phase circuit 6 is constituted by a counter circuit for counting outputs from the comparator circuits 7 and 8, and a comparing circuit for comparing the counter value of the counter circuit with a comparison value variable by the setting of the microcomputer 2. The comparing phase circuit 6 detects the phase difference between the S phase output as a sensor output that changes depending on the driving state of the vibration wave motor and the A phase input as a driving input in the vibration wave motor 19, as the time difference between outputs from the comparator circuits 7 and 8 via a voltage divider/high-pass filter circuit formed from resistors 25 to 30 and capacitors 31 to 33. When the phase difference reaches a predetermined value, the comparing phase circuit 6 sends an output PLE to the microcomputer 2.

The microcomputer 2 changes the output VCODAC based on the output PLE to control the vibration wave motor. A driving start switch 36 starts driving the vibration wave motor 19, and a switch 37 determines the rotation direction of the vibration wave motor 19. The vibration wave motor 19 is a known motor in which piezoelectric members serving as electromechanical energy conversion elements are arranged on a vibration member, and periodic signals (AC signals) having different phases are applied to the conversion elements formed as A and B phases to excite the vibration member.

Figure 2:
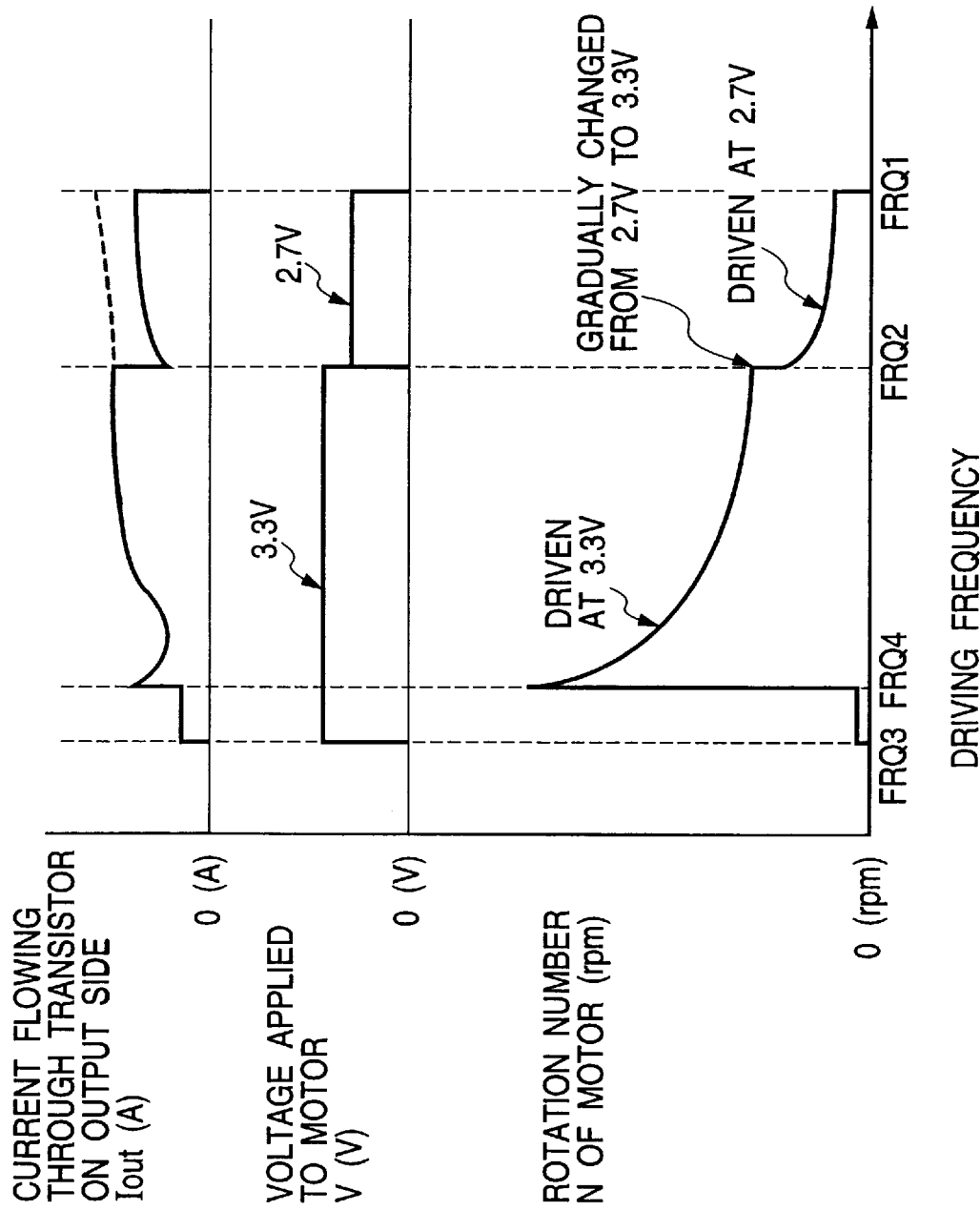
FIG. 2 is a graph showing motor driving characteristics according to the first embodiment of the present invention.

FIG. 2 is a graph showing the driving characteristics of the vibration wave motor 19 according to the first embodiment. The abscissa represents the driving frequency, and the ordinate represents the following three characteristics.

The upper stage shows a current Iout (A) flowing through a transistor on the output side of the motor driver 13.

The middle stage shows a voltage V (V) applied to the motor that is changed by the voltage regulator 35.

The lower stage shows a rotation number N (rpm) of the vibration wave motor 19.

The vibration wave motor 19 is driven using a higher frequency range than the resonant point. Accordingly, the rotation number N of the motor decreases for a higher driving frequency and increases for a lower driving frequency.

If the driving frequency is decreased too much, for example from FRQ4 to FRQ3 in FIG. 2, the rotation number N abruptly decreases. The microcomputer 2 changes the output VCODAC based on the output PLE to control the vibration wave motor, as described above, in order to prevent an abrupt decrease in rotation number.

As the voltage applied to the motor is higher, the current Iout flowing through the transistor on the output side is larger, and the rotation number N is larger.

The dotted line between FRQ1 and FRQ2 indicating the current Iout flowing through the transistor on the output side is for 3.3 V, and the solid line is for 2.7 V.

A resonant frequency FRE of an electrical circuit made of the sum of the capacitance between A and −A phase electrodes 21 and 22 of the vibration wave motor 19 and the capacitance of the capacitor 16 and the inductance of the coil 14 is set higher than FRQ1. The resonant frequency of an electrical circuit made of the sum of the capacitance between B and −B phase electrodes 23 and 24 and the capacitance of the capacitor 17 and the inductance of the coil 15 is similarly set.

Accordingly, the current Iout flowing through the transistor on the output side increases as the driving frequency increases (comes near FRE). Since the current Iout flowing through the transistor on the output side is large in an operation region with a small rotation number N of the motor, the power consumption becomes large.

In this embodiment, the applied voltage V=2.7 V is applied between the driving frequencies FRQ1 and FRQ2, and the applied voltage V=3.3 V is applied between the driving frequencies FRQ2 and FRQ3. This can decrease the current Iout flowing through the transistor on the output side in an operation region with a small rotation number N of the motor, thereby reducing the power consumption.

In activation, the vibration wave motor 19 is driven at the applied voltage V=2.7 V and the driving frequency FRQ1. After that, the driving frequency is decreased from FRQ1 to FRQ2.

At the driving frequency FRQ2, the applied voltage corresponding to the value VDAC is changed such that changes per time in rotation number N of the motor in decreasing VDAC=8 AH (output voltage=2.7 V) to VDAC= A9 H (output voltage=3.3 V) coincide with changes per time in rotation number N of the motor in decreasing the driving frequency from FRQ1 to FRQ2.

At VDAC=A9 H (output voltage=3.3 V), the driving frequency is decreased from FRQ2 to FRQ4. The driving frequency is controlled between FRQ2 and FRQ4 by the aforementioned phase detection. When the driving frequency decreases to FRQ4, the motor reaches the maximum rotation number. Note that the vibration wave motor 19 is stopped by control reverse to activation control.

Second Embodiment

Figure 3:
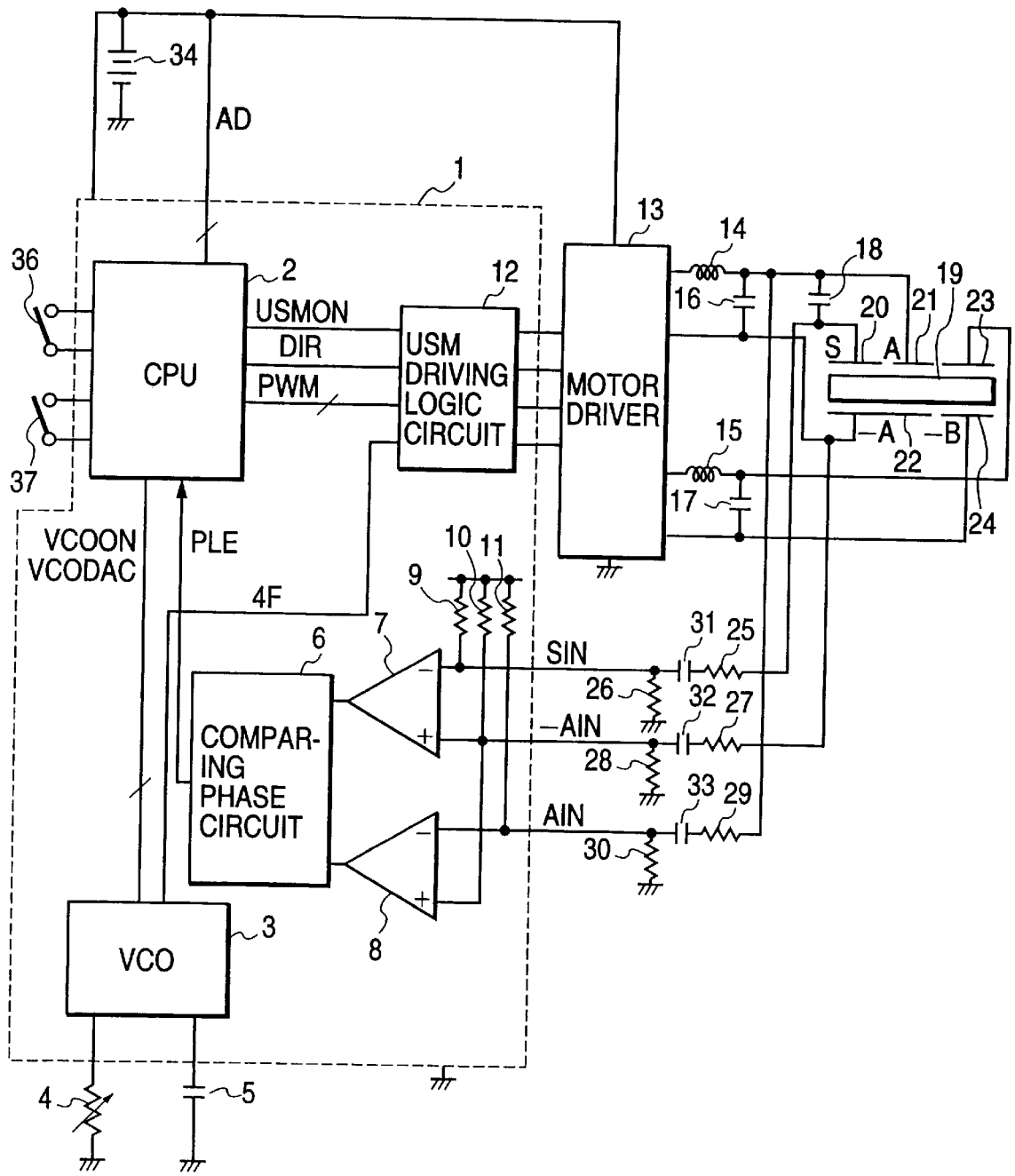
FIG. 3 is a block diagram showing the second embodiment of the present invention.
Figure 4:
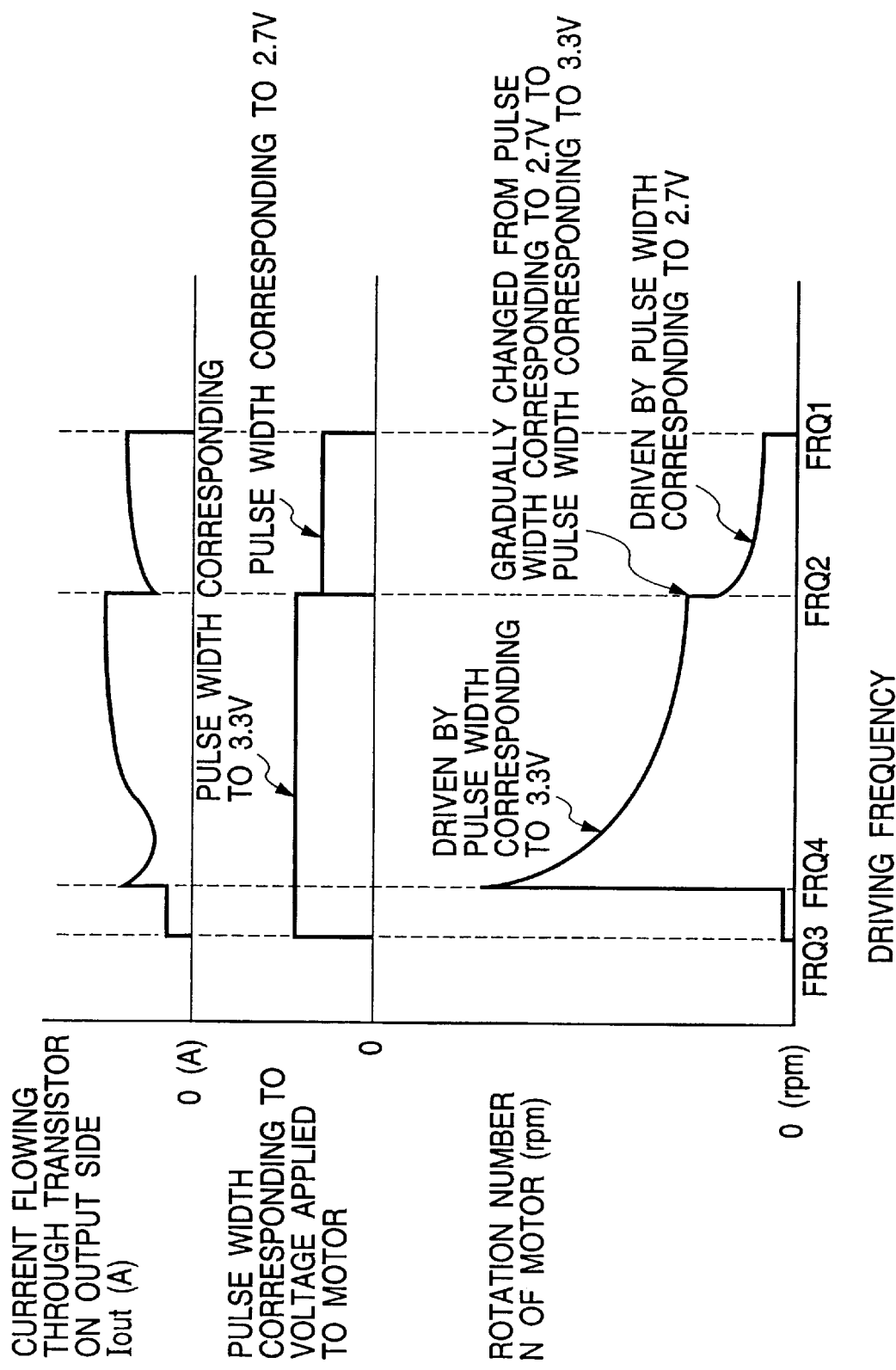
FIG. 4 is a graph showing motor driving characteristics according to the second embodiment of the present invention.
Figure 5:
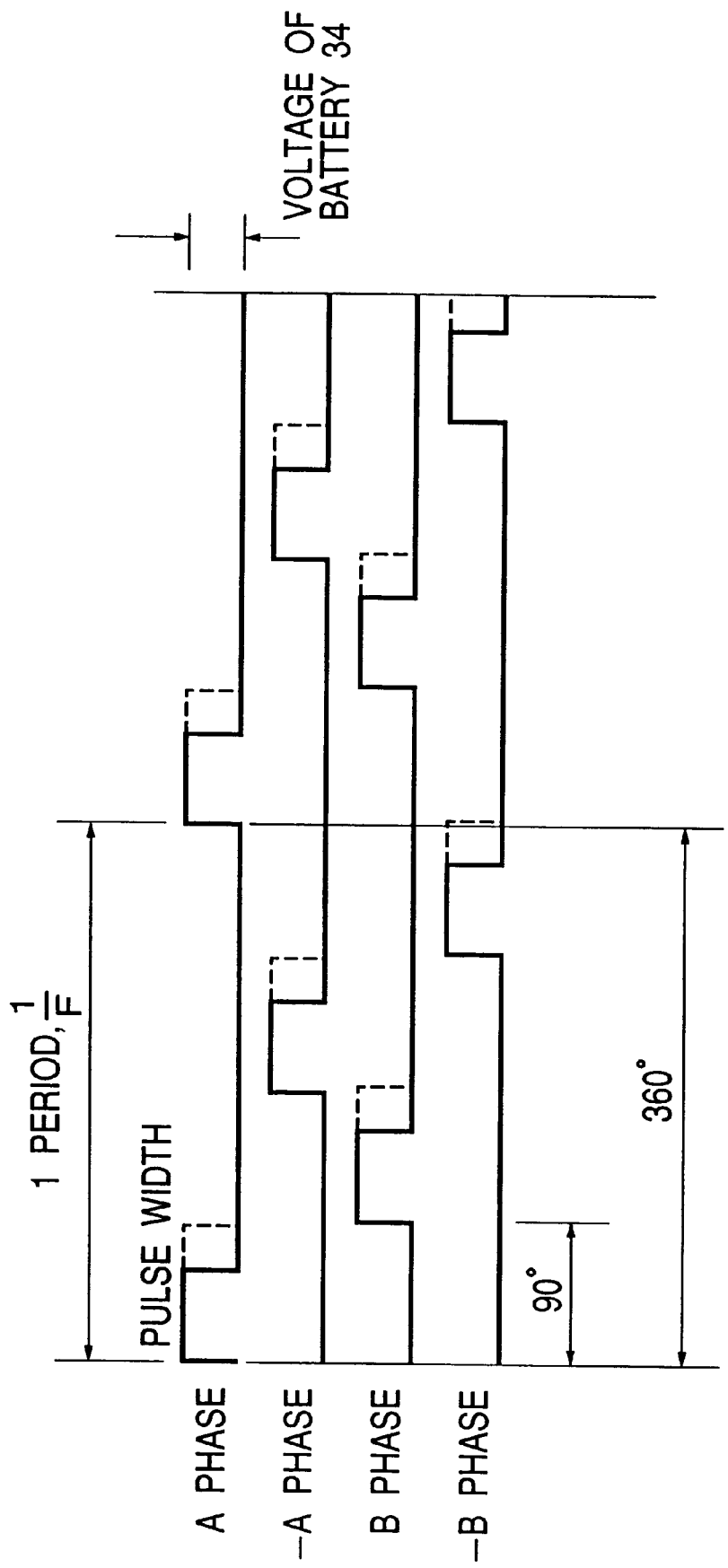
FIG. 5 is a waveform chart showing the voltage of a motor driver 13 upon changing the pulse width according to the second embodiment of the present invention.

FIGS. 3 to 5 show the second embodiment. FIGS. 3 and 4 correspond to FIGS. 1 and 2 showing the first embodiment.

The second embodiment shown in FIG. 3 is different from the first embodiment shown in FIG. 1 in the following point. In FIG. 1, the power supply voltage of the motor driver 13 is changed by the voltage regulator 35. To the contrary, in the second embodiment, the voltage of a battery 34 is detected by an internal AD converter circuit of a microcomputer 2, and the pulse width of an output from a motor driver 13 is changed by a pulse width modulation (PWM) function of a driving logic circuit 12 for a vibration wave motor, instead of changing the power supply voltage.

More specifically, the pulse width is changed by an output PWM (8 bits) from the microcomputer 2. For example, when the voltage of the battery 34 is 5 V, the pulse width is controlled to a pulse width corresponding to an output voltage of 3.3 V in the first embodiment for PWM=A9 H, and to an output voltage of 2.7 V for PWM=8 AH. In other words, the pulse width is set to correspond to an output voltage of 3.3 V for PWM=A9 H and an output voltage of 2.7 V for PWM=8 AH regardless of the voltage of the battery 34.

FIG. 5 shows the waveform of the output voltage of the motor driver 13 in this case. The solid line represents a pulse width corresponding to 2.7 V, and the dotted line represents a pulse width corresponding to 3.3 V.

Changing this pulse width changes the applied voltage of a driving periodic signal. The −A phase shifts from the A phase by 180°, the B phase shifts by 90°, and the −B phase shifts by 270°.

To reversely rotate the motor, the relationship between the B and −B phases is reversed. In this arrangement, a pulse width corresponding to 2.7 V is set at a driving frequency from FRQ1 to FRQ2. The pulse width is gradually changed to one corresponding to 3.3 V at FRQ2, and set at one corresponding to 3.3 V from FRQ2 to FRQ4.

Third Embodiment

Figure 6:
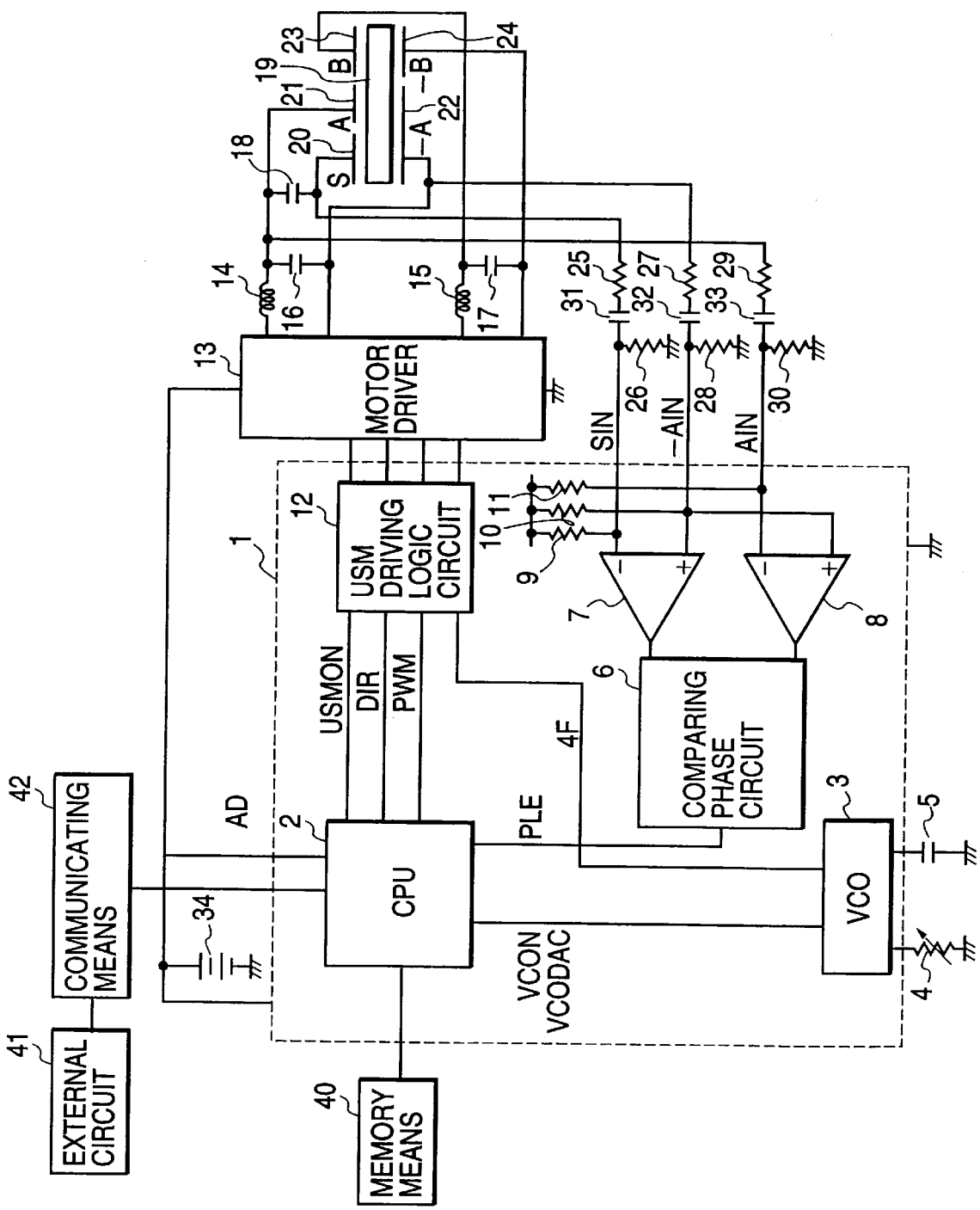
FIG. 6 is a block diagram showing a vibration type motor device according to the third embodiment of the present invention.

FIG. 6 is a block diagram showing the third embodiment of the present invention.

Referring to FIG. 6, the same reference numerals as in the second embodiment of FIG. 3 denote the same parts, and a description thereof will be omitted. A comparing phase circuit 6 will be explained in detail.

The comparing phase circuit 6 is constituted by a counter circuit for counting outputs from comparator circuits 7 and 8, and a comparing circuit for comparing the counter value of the counter circuit with a comparison value variably set by a microcomputer 2. The comparing phase circuit 6 detects the phase difference between the S phase output as a sensor output and the A phase input as a driving input in a vibration wave motor 19 that changes depending on the driving state of the vibration type motor (vibration wave motor), as the time difference between outputs from the comparator circuits 7 and 8 via a voltage divider/high-pass filter circuit formed from resistors 25 to 30 and capacitors 31 to 33. When the phase difference reaches a first value K1 (on the lower stage in FIG. 7), the comparing phase circuit 6 sends an output PLE1 to the microcomputer 2. When the phase difference reaches a second value K2 (on the lower stage in FIG. 7), the comparing phase circuit 6 sends an output PLE2 to the microcomputer 2. The microcomputer 2 changes an output VCODAC based on the signal PLE to control the vibration wave motor.

Values such as VCODAC under each driving condition are stored in an erasable memory means (EEPROM) 40.

Note that when the erasable memory means 40 is used for, e.g., an interchangeable lens of a single-lens reflex camera, if the lens is removed during a write in the erasable memory means (EEPROM) 40, the power supply becomes unstable to write erroneous information.

For this reason, information can only be written when the power supply is stable, e.g., in shipment from the factory or in adjustment in the service section.

An external circuit 41 performs communication via a communicating means 42.

The vibration wave motor (vibration type motor) is constituted by arranging an electromechanical energy conversion element portion such as a piezoelectric member on an elastic member. Periodic signals (different in phase) are applied to generate the vibration of the elastic member, thereby obtaining a driving force. The vibration wave motor has a ring or bar shape.

Figure 7:
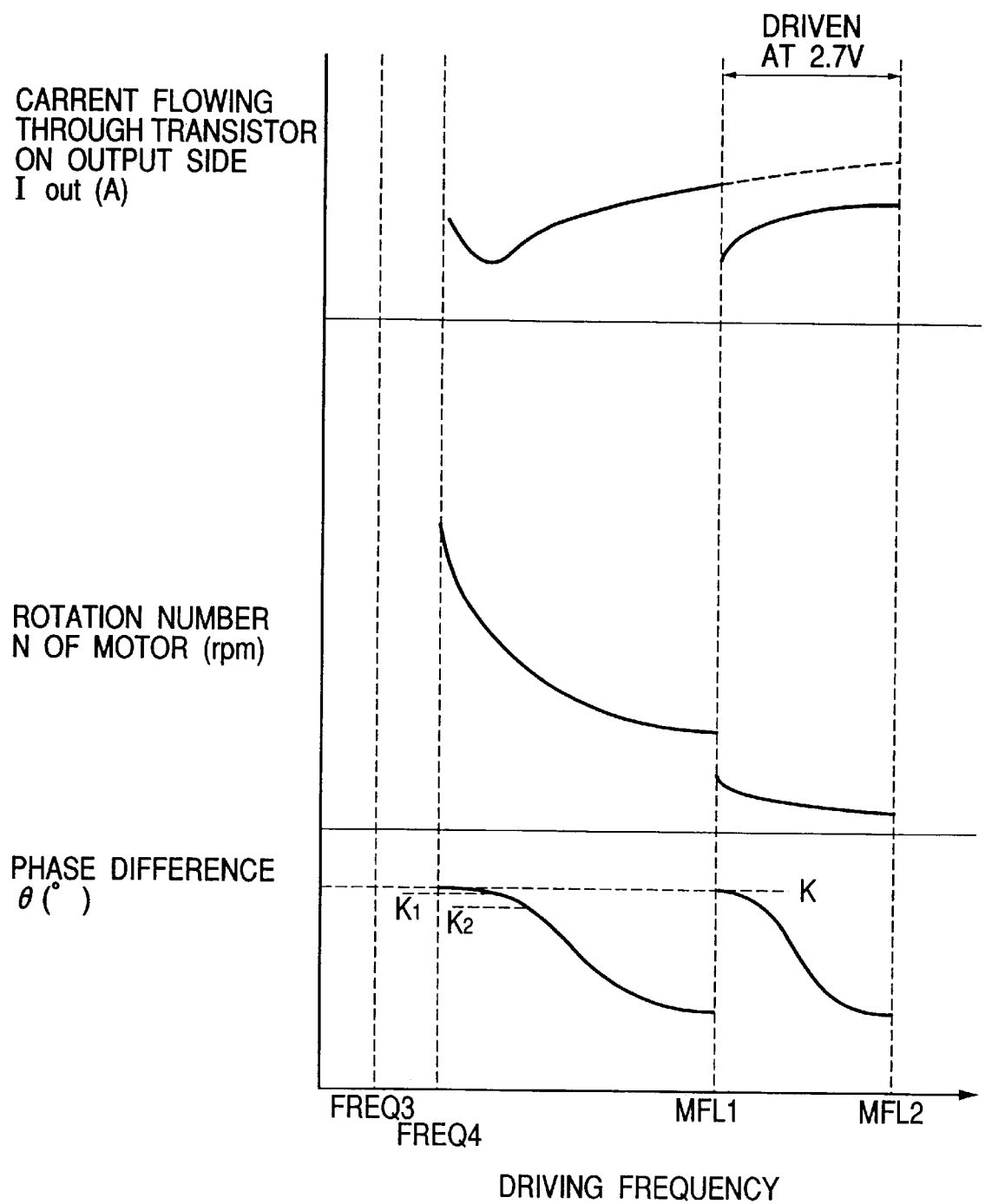
FIG. 7 is a graph showing the motor driving characteristics of the vibration type motor shown in FIG. 6.

FIG. 7 is a graph showing the driving characteristics of the vibration wave motor (vibration type motor) 19 according to the present invention.

The abscissa represents the driving frequency, and the ordinate represents the following three characteristics.

The upper stage shows a current Iout (A) flowing through a transistor on the output side of the motor driver 13.

The middle stage shows a rotation number N (rpm) of the vibration type motor (vibration wave motor) 19.

The lower stage shows a phase difference θ (°) between the A and S phases.

The driving characteristic of the vibration wave motor 19 is that the rotation number N of the motor decreases for a higher driving frequency and increases for a lower driving frequency. If the driving frequency is decreased too much (from FREQ4 to FREQ3), the rotation number N abruptly decreases.

To prevent this, the phase is conventionally controlled. However, at a driving voltage of 2.7 V, the phase difference between the A and S phases on the lower stage has already reached a phase difference K as in resonance. Although the driving state is not an actual resonance state, phase control undesirably limits the driving frequency.

As the voltage applied to the motor is higher, the current Iout flowing through the transistor on the output side is larger, and the rotation number N is larger.

The dotted line between MFL21 and MFL1 indicating the current Iout flowing through the transistor on the output side is for 3.3 V, and the solid line is for 2.7 V.

A resonant frequency FRE of an electrical circuit made of the sum of the capacitance between A and −A phase electrodes 21 and 22 of the vibration wave motor 19 and the capacitance of a capacitor 16 and the inductance of a coil 14 is set higher than MFL2. The resonant frequency of an electrical circuit made of the sum of the capacitance between B and −B phase electrodes 23 and 24 and the capacitance of a capacitor 17 and the inductance of a coil 15 is similarly set. As a result, the current Iout flowing through the transistor on the output side increases as the driving frequency increases (comes near FRE).

Since the current Iout flowing through the transistor on the output side is large in an operation region with a small rotation number N of the motor, the power consumption becomes large.

For this reason, the applied voltage V=2.7 V is applied between the driving frequencies MFL2 and MFL1, and the applied voltage V 3.3 V is applied between the driving frequencies MFL1 and FREQ3 as an applied voltage higher than an applied voltage in a high frequency region. This can decrease the current Iout flowing through the transistor on the output side in an operation region with a small rotation number N of the motor, thereby reducing the power consumption.

Each vibration wave motor 19 has different resonant and activation start frequencies. To decrease Iout, the activation start frequency MFL2 and driving condition switching frequency MFL1 are desirably adjusted for each vibration type motor (vibration wave motor) 19.

This can be achieved by adjusting the resistance value of a resistor 4 for each vibration type motor (vibration wave motor) 19.

It is, however, difficult to adjust the resistance value of the resistor 4 for each vibration type motor (vibration wave motor) 19.

The resistance value of the resistor 4 is therefore adjusted for a frequency at a specific value of VCODAC.

Since a frequency value by VCODAC, which has a larger difference from a set value in adjustment, increases an error, the frequency in adjustment is set to one requiring high precision.

Further, a frequency changeable from a set value in adjustment is minimized not to erroneously operate the vibration type motor (vibration wave motor) 19 even if information in the erasable memory means (EEPROM) 40 is wrong.

VCODAC values for setting the activation start frequency MFL2 and driving condition switching frequency MFL1 for each vibration type motor (vibration wave motor) 19 are stored in the erasable memory means (EEPROM) 40. Using these values, the vibration wave motor 19 is controlled.

The values in the erasable memory means (EEPROM) 40 are used to calculate and determine the activation start frequency MFL2 and driving condition switching frequency MFL1.

For example, only the activation start frequency MFL2 is stored, and the driving condition switching frequency MFL1 is determined from the value of the activation start frequency MFL2, which can reduce the memory capacity of the erasable memory means (EEPROM) 40 and the communication time with the erasable memory means (EEPROM) 40.

The stored value can be reset by the external circuit 41 via the communicating means 42.

As described above, switching driving conditions can decrease the current Iout flowing through the transistor on the output side and reduce the power consumption. However, the phase difference on the lower stage reaches a phase difference as in resonance at an applied voltage of 2.7 V, so that the driving frequency is limited by phase control.

The third embodiment therefore prevents the driving frequency from being limited by phase control even upon switching driving conditions.

Operation in the present invention will be described.

Figure 8:
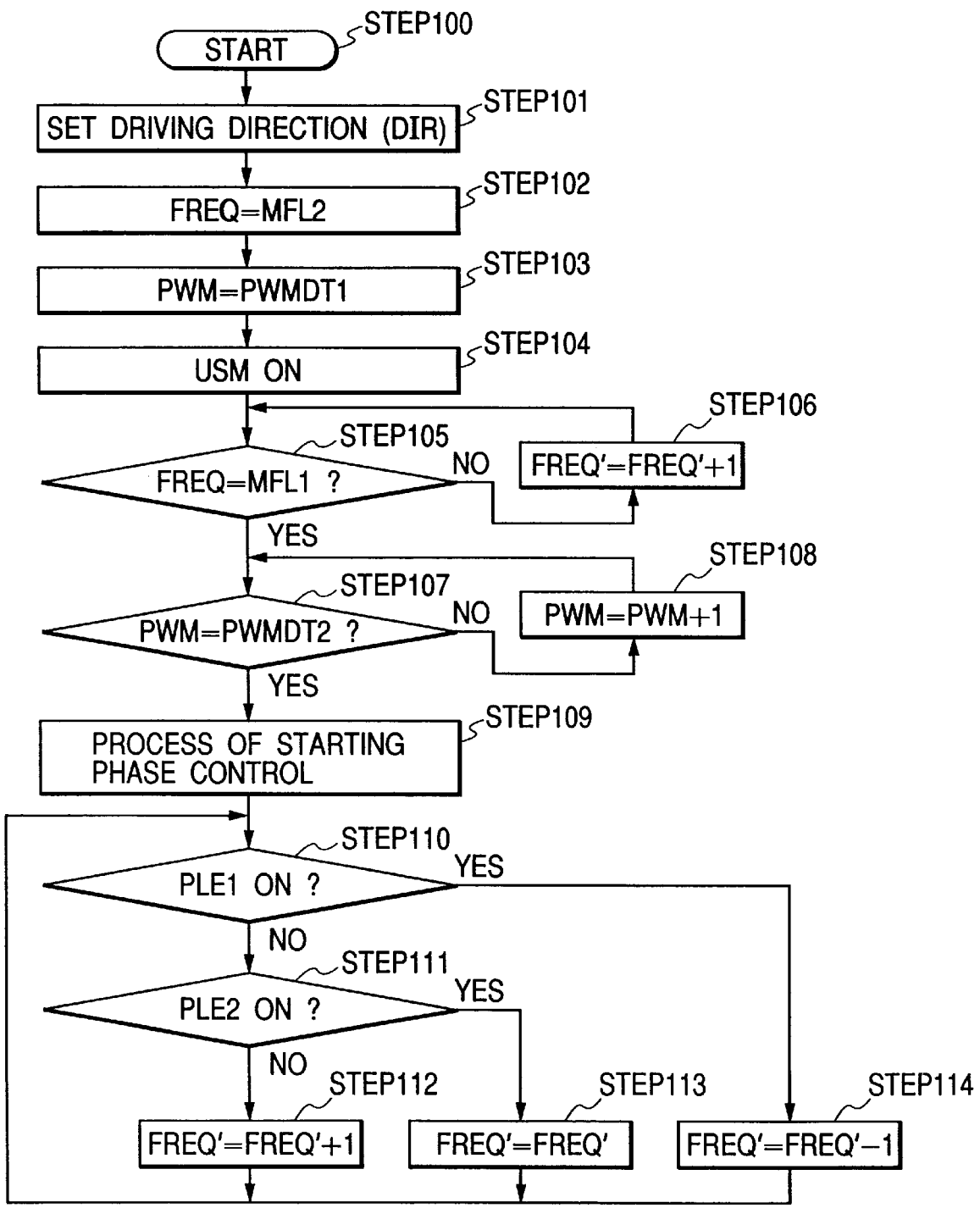
FIG. 8 is a flow chart for explaining operation of the device in FIG. 6.

FIG. 8 is a flow chart showing operation of a microcomputer 2.

The operation will be explained with reference to this flow chart. The flow chart exemplifies the third embodiment applied to a camera system.

The flow chart starts upon reception of a driving instruction from a camera (not shown) at step 100.

At step 101, the microcomputer 2 sets a terminal DIR to High or Low in accordance with a driving instruction from the camera.

At step 102, the microcomputer 2 sets a maximum driving frequency (MFL2) using a driving frequency (FREQ) as an activation frequency.

At step 103, the microcomputer 2 sets a pulse width (PWM) for determining the driving voltage to PWMDT1 corresponding to 2.7 V.

At step 104, the microcomputer 2 starts activating the vibration type motor (vibration wave motor) (USM).

At step 105, the microcomputer 2 compares the driving frequency (FREQ) with a driving condition switching frequency (MFL1). If FREQ=MFL1, the flow advances to step 107; otherwise, to step 106.

At step 106, the microcomputer 2 increments a value FREQ' for determining the driving frequency (FREQ) to decrease the driving frequency by one step. Note that the driving frequency is lower as the value FREQ' for determining the driving frequency is larger.

By steps 105 and 106, the driving frequency (FREQ) is gradually decreased to the driving condition switching frequency (MFL1).

At step 107, when the driving frequency (FREQ) reaches the driving condition switching frequency (MFL1), the microcomputer 2 fixes the driving frequency (FREQ), and compares the pulse width (PWM) for determining the driving voltage with a pulse width PWMDT2 corresponding to 3.3 V. If PWM=PWMDT2, the flow shifts to step 109; otherwise, to step 108.

At step 108, the microcomputer 2 increments PWM to increase the driving voltage by one step.

By steps 107 and 108, the pulse width (PWM) for determining the driving voltage is gradually increased to PWMDT2 to switch driving conditions to 3.3-V driving.

At step 109, upon completion of switching driving conditions, the microcomputer 2 performs a process of starting phase control, thus starting phase control.

At step 110, the microcomputer 2 checks a signal PLE1. If the signal PLE1 is ON, the flow shifts to step 114; if the signal PLE1 is OFF, to step 111.

At step 111, the microcomputer 2 checks a signal PLE2. If the signal PLE2 is ON, the flow shifts to step 113; if the signal PLE2 is OFF, to step 112.

At step 112, since both the signals PLE1 and PLE2 are OFF, the microcomputer 2 determines that the driving frequency has not reached the resonant frequency yet, and decreases the driving frequency by one step to increase the driving speed of the vibration type motor (vibration wave motor). Then, the flow returns to step 110.

At step 113, since the signal PLE2 is determined in step 111 to be ON, the microcomputer 2 determines that the driving frequency has reached the resonant frequency, and maintains the driving frequency (FREQ). The flow returns to step 110.

At step 114, since the signal PLE1 is determined in step 110 to be ON, the microcomputer 2 determines that the driving frequency is very near to the resonant frequency, and increases the driving frequency (FREQ) by one step to prevent the vibration wave motor from suddenly stopping at a frequency becoming higher than the resonant frequency. After that, the flow returns to step 110.

As described above, when the voltage applied to the motor driver is 2.7 V, phase control is inhibited. After driving conditions are switched, and the voltage applied to the motor driver rises to 3.3 V, phase control starts. The vibration type motor (vibration wave motor) can be stably, reliably activated and vibrated without receiving erroneous phase difference information.

The above-mentioned operation concerns activation (acceleration) and can be similarly adopted to stop (deceleration).

What is claimed is:

1. A driving device for a vibration type motor for generating a vibration of a vibration member so as to obtain a driving force by applying a driving periodic signal to an electromechanical energy conversion element portion arranged on a vibration member, comprising:
    a frequency setting circuit for setting a frequency of the periodic signal; and
    an adjusting circuit for adjusting a level of the periodic signal applied to the electromechanical energy conversion element portion in accordance with the frequency set by said frequency setting circuit, said circuit adjusting the level of the periodic signal which is set as a high frequency to a level lower than the level of the periodic signal which is set as a low frequency.

2. A device according to claim 1, wherein said adjusting circuit adjusts the level to a first level when the frequency falls within a first range, and to a second level higher than the first level when the frequency is lower than the frequency within the first range.

3. A device according to claim 1, wherein said adjusting circuit adjusts the level to a first level when the frequency falls within a first range, and to a second level higher than the first level when the frequency falls within a second frequency range lower than the first range.

4. A device according to claim 1, wherein said adjusting circuit adjusts the level to a level not exceeding a predetermined level when the frequency falls within a first range, and to a level higher than the predetermined level when the frequency is lower than the frequency within the first range.

5. A device according to claim 1, wherein said adjusting circuit adjusts the level to a level not exceeding a predetermined level when the frequency falls within a first range, and to a level higher than the predetermined level when the frequency falls within a second frequency range lower than the first range.

6. A device according to claim 1, wherein said adjusting circuit comprises a pulse signal forming circuit for forming a pulse signal and a pulse width changing circuit for changing a pulse width of the pulse signal, and changes the pulse width to change the level.

7. A device according to claim 2, wherein said adjusting circuit comprises a pulse signal forming circuit for forming a pulse signal and a pulse width changing circuit for changing a pulse width of the pulse signal, and changes the pulse width to change the level.

8. A device according to claim 3, wherein said adjusting circuit comprises a pulse signal forming circuit for forming a pulse signal and a pulse width changing circuit for changing a pulse width of the pulse signal, and changes the pulse width to change the level.

9. A device according to claim 4, wherein said adjusting circuit comprises a pulse signal forming circuit for forming a pulse signal and a pulse width changing circuit for changing a pulse width of the pulse signal, and changes the pulse width to change the level.

10. A device according to claim 5, wherein said adjusting circuit comprises a pulse signal forming circuit for forming a pulse signal and a pulse width changing circuit for changing a pulse width of the pulse signal, and changes the pulse width to change the level.

11. A driving device for a vibration type motor in which an electromechanical energy conversion element portion is arranged on a vibration member, and a periodic signal is applied to the element portion to generate a vibration of the vibration member, so as to obtain a driving force, comprising:
    driving force control means for changing a frequency of the periodic signal to change the driving force;
    detecting means for detecting a shift from a resonant frequency of the vibration type motor;
    regulating means for regulating or changing the frequency by said driving force control means in accordance with the shift from the resonant frequency of the vibration type motor that is detected by said detecting means;
    condition setting means for setting a driving condition of the vibration type motor; and
    switching means for switching over between operative and inoperative states of said regulating means in accordance with the driving condition set by said condition setting means.

12. A device according to claim 11, wherein the driving condition is a voltage level of the periodic signal, and said switching means switches over between operative and inoperative states of said regulating means in accordance with the voltage level.

13. A device according to claim 12, wherein said switching means activates an operation of said regulating means when the voltage level is higher than a first level, and suspends the operation of said regulating means when the voltage is not more than the first level.

14. A device according to claim 12, wherein said switching means activates an operation of said regulating means when the frequency of the periodic signal falls within a frequency range and lower than a predetermined frequency, and the voltage level is higher than a first level.

15. A device according to claim 11, wherein said detecting means detects a phase difference between an output generated by monitoring means corresponding to a vibration state of the vibration member, and the periodic signal, so as to detect a shift from the resonant frequency.

16. A device according to claim 11, wherein said condition setting means sets the driving condition to different conditions during the frequency of the periodic signal is changed.

17. A driving device for a vibration type motor in which an electromechanical energy conversion element portion is arranged on a vibration member, and a periodic signal is applied to the element portion to generate a vibration of the vibration member, so as to obtain a driving force, comprising:
    driving force control means for changing a frequency of the periodic signal to change the driving force;
    detecting means for detecting a shift from a resonant frequency of the vibration type motor;
    regulating means for regulating or changing the frequency by said driving force control means in accordance with the shift from the resonant frequency of the vibration type motor that is detected by said detecting means; and control means for suspending an operation of said regulating means when the frequency of the periodic signal is higher than a predetermined frequency, and a voltage of the periodic signal is lower than a predetermined voltage, and activating the operation of said regulating means when the frequency of the periodic signal is lower than the predetermined frequency, and the voltage of the periodic signal is higher than the predetermined voltage.

18. A device according to claim 17, wherein said detecting means detects a phase difference between an output generated by monitoring means corresponding to a vibration state of the vibration member, and the periodic signal, so as to detect a shift from the resonant frequency.

19. A method of driving a vibration type motor in which first and second driving signals are respectively applied to first and second electrodes of the vibration type motor to vibrate an elastic vibration member and a phase difference between a detection signal from a vibration detecting electrode for detecting a vibration state of the elastic vibration member and the first driving signal is detected to control or regulate the driving signal, and a driving condition of the vibration type motor is switched during driving, comprising a step of switching a process methods respecting to the detection of the phase difference in a first driving condition from a start of activation to switching of the driving condition, and a second driving condition after the driving condition is switched from the first driving condition.

20. A method according to claim 19, further comprising a step of inhibiting control/regulation of the driving signal by phase difference detection under the first driving condition, and a step of permitting control/regulation by phase different detection after switching to the second driving condition.

21. A method according to claim 20, wherein the first driving condition is a condition for setting a voltage level of the driving signal to a voltage lower than a predetermined voltage, and the second driving condition is a condition for setting the voltage level of the driving signal to a voltage higher than the predetermined voltage.

22. A driving device for a vibration type motor in which an electromechanical energy conversion element portion is arranged on a vibration member, and a periodic signal is applied to the element portion to generate a vibration of the vibration member, so as to obtain a driving force, comprising:

driving force control means for changing a frequency of the periodic signal to change the driving force;

detecting means for detecting a shift from a resonant frequency of the vibration type motor;

regulating means for regulating or changing the frequency by said driving force control means in accordance with the shift from the resonant frequency of the vibration type motor that is detected by said detecting means;

condition setting means for setting a driving condition of the vibration type motor to different conditions when the frequencies of the periodic signal are higher and lower than a predetermined frequency; and switching means for switching over between operative or inoperative state of said regulating means in accordance with the driving condition set by said condition setting means.

23. A device according to claim 22, wherein the driving condition is a voltage level of the periodic signal, and said switching means switches over between operative or inoperative state of said regulating means in accordance with the voltage level.

24. A device according to claim 23, wherein said condition setting means sets the voltage level to a first level when the frequency is higher than a predetermined frequency, and to a level higher than the first level when the frequency is lower than the predetermined frequency, and said switching means activates an operation of said regulating means in a state that the voltage level is set higher than the first level, and suspends the operation of said regulating means in a state that the voltage level is at the first level.

* * * * *

UNITED STATES PATENT AND TRADEMARK OFFICE
CERTIFICATE OF CORRECTION

PATENT NO. : 6,100,654
DATED : August 8, 2000
INVENTOR(S) : Kazuhiro Izukawa et al.

It is certified that error appears in the above-identified patent and that said Letters Patent is hereby corrected as shown below:

Column 7,
Line 14, "V 3.3 V" should read -- V = 3.3 V --.

Signed and Sealed this

Twenty-sixth Day of March, 2002

Attest:

JAMES E. ROGAN
*Attesting Officer*   *Director of the United States Patent and Trademark Office*